United States Patent [19]

Qiao et al.

[11] Patent Number: 5,485,291
[45] Date of Patent: Jan. 16, 1996

[54] UNIFORMLY THIN, HIGH EFFICIENCY LARGE AREA LIGHTING PANEL WITH TWO FACET GROOVES THAT ARE SPACED APART AND HAVE LIGHT SOURCE FACING FACETS WITH SMALLER SLOPES THAN THE FACETS FACING AWAY FROM THE LIGHT SOURCE

[75] Inventors: Yong Qiao; William F. Redmond; Richard E. Dunah; Werner W. Ciupke, Sonoma County, all of Calif.

[73] Assignee: Precision Lamp, Inc., Cotati, Calif.

[21] Appl. No.: 199,721

[22] Filed: Feb. 22, 1994

[51] Int. Cl.[6] .................. G02F 1/1335; G01D 11/28; F21V 7/04
[52] U.S. Cl. .................. 359/49; 362/26; 362/31; 385/901
[58] Field of Search ............. 359/49; 385/146, 385/901; 362/26, 27, 31, 32, 326, 327, 330

[56] References Cited

U.S. PATENT DOCUMENTS

| | | | |
|---|---|---|---|
| 2,646,637 | 7/1953 | Nierenberg et al. | 40/364 |
| 4,257,084 | 3/1981 | Reynolds | 362/31 |
| 4,260,220 | 4/1981 | Whitehead | 385/133 |
| 4,277,817 | 7/1981 | Hehr | 362/31 |
| 4,323,951 | 4/1982 | Pasco | 362/27 |
| 4,528,617 | 7/1985 | Blackington | 362/32 |
| 4,659,183 | 4/1987 | Suzawa | 359/49 |
| 4,706,173 | 11/1987 | Hamada et al. | 362/341 |
| 4,791,540 | 12/1988 | Dreyer, Jr. et al. | 362/331 |
| 4,799,137 | 1/1989 | Aho | 362/309 |
| 4,883,333 | 11/1989 | Yanez | 362/32 |
| 4,909,604 | 3/1990 | Kobayashi et al. | 359/49 |
| 4,984,144 | 1/1991 | Cobb et al. | 362/339 |
| 5,005,108 | 4/1991 | Pristash et al. | 362/31 |
| 5,036,435 | 7/1991 | Tokuda et al. | 362/31 |
| 5,046,826 | 9/1991 | Iwamoto et al. | 362/31 |
| 5,050,946 | 9/1991 | Hathaway et al. | 385/33 |
| 5,070,431 | 12/1991 | Kitazawa et al. | 362/31 |
| 5,079,675 | 1/1992 | Nakayama | 362/31 |
| 5,093,765 | 3/1992 | Kashima et al. | 362/31 |
| 5,126,882 | 6/1992 | Oe et al. | 359/619 |
| 5,128,842 | 7/1992 | Kenmochi | 362/95 |
| 5,227,773 | 7/1993 | Wu et al. | 340/815.56 |

FOREIGN PATENT DOCUMENTS

| | | |
|---|---|---|
| 3825436A | 3/1989 | Germany . |
| 465376 | 8/1951 | Italy . |
| 62-73206 | 4/1987 | Japan . |
| 63-287803 | 11/1988 | Japan . |
| 63-271301 | 11/1988 | Japan . |

*Primary Examiner*—William L. Sikes
*Assistant Examiner*—Walter J. Malinowski
*Attorney, Agent, or Firm*—Flehr, Hohbach, Test, Albritton & Herbert

[57] ABSTRACT

A lighting panel providing uniform illumination is described. The panel includes a transparent light guide which has a faceted grooved major surface and a parallel planar surface. The lighting panel introduces light into one end of the light guide. The facets facing the light source are inclined so that they reflect the incident light primarily along the light guide to be reflected from the opposite end. The facet facing away from the light source is inclined to reflect light out through the planar major surface.

31 Claims, 6 Drawing Sheets

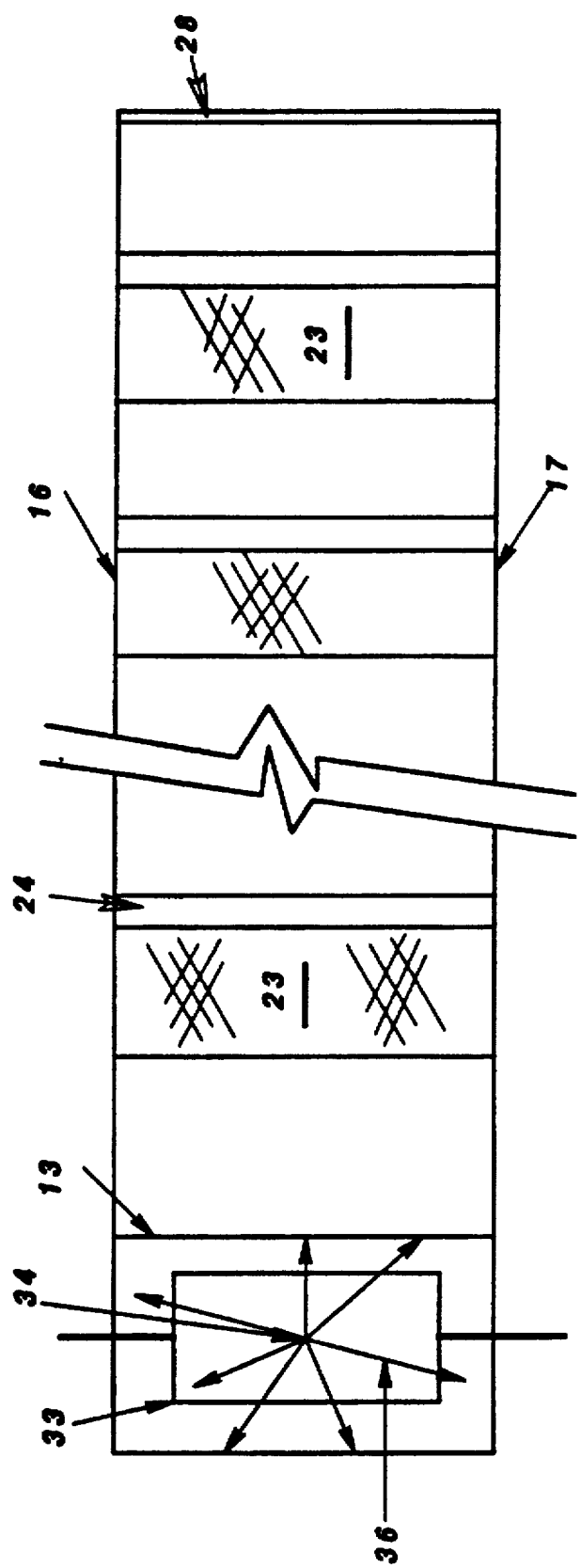

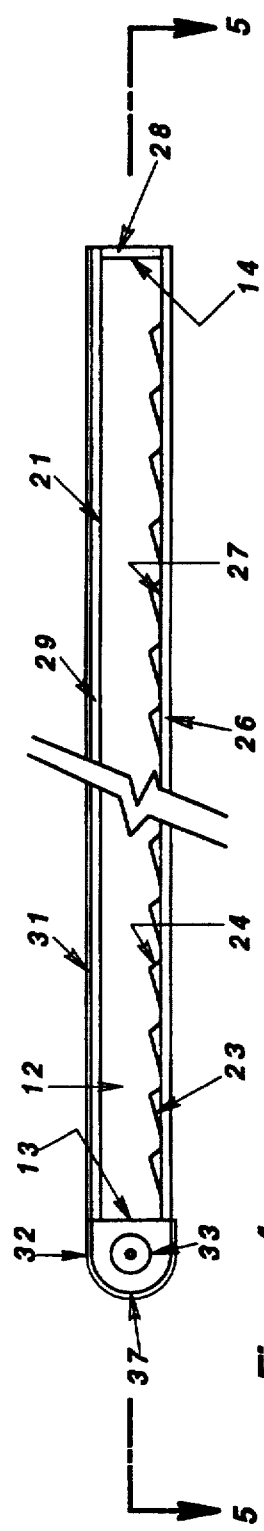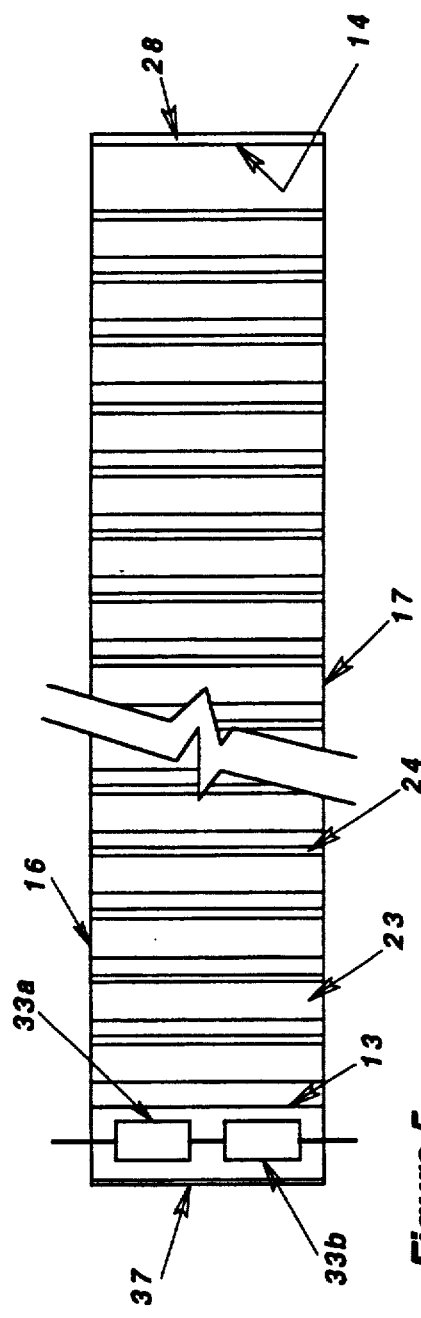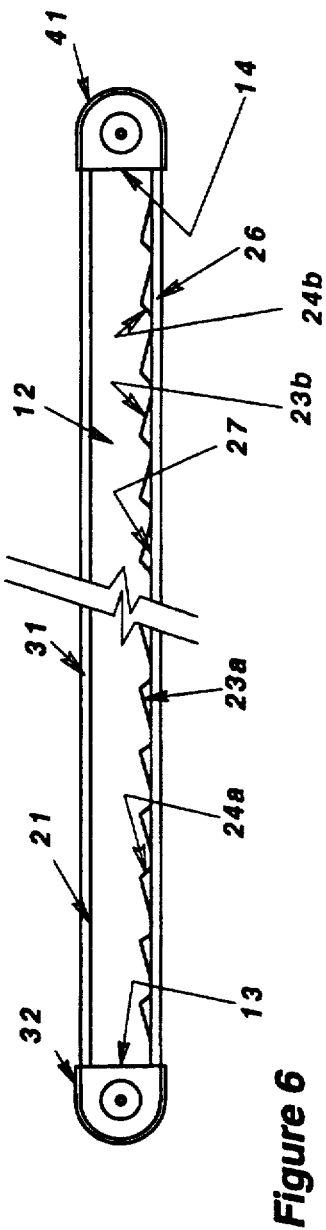

UNIFORMLY THIN, HIGH EFFICIENCY LARGE AREA LIGHTING PANEL WITH TWO FACET GROOVES THAT ARE SPACED APART AND HAVE LIGHT SOURCE FACING FACETS WITH SMALLER SLOPES THAN THE FACETS FACING AWAY FROM THE LIGHT SOURCE

BRIEF DESCRIPTION OF THE INVENTION

This invention relates generally to a flat, thin, large area lighting panel, and more particularly to a large area lighting panel employing a uniformly thin light guide having a planar major surface, a parallel major surface which includes faceted grooves opposite said planar major surface, and a reflecting surface opposite said faceted grooved surface.

BACKGROUND OF THE INVENTION

Large area lighting panels employing thin light guides with edge lit end surfaces are known. Many of these large area lighting panels have in common the fact that they do not have a uniform thickness, which is desirable in many applications, such as back-lighting of liquid crystal displays (LCDs) for pagers, hand-held and portable computers, organizers, and the like. In addition, they are not as easily and inexpensively manufactured as are uniformly thin panels. Many large area lighting panels do not provide uniform light. This drawback is overcome to some degree by using a diffuser between the lighting panel and the display; however, this increases the thickness and the cost of the lighting panel. In some large area lighting panels, several individual sources project light into the guide. In some instances, this results in striations of the observed light emitted by the panel.

OBJECTS AND SUMMARY OF THE INVENTION

It is an object of this invention to provide an efficient, uniformly thin large area lighting panel.

It is another object of the invention to provide a uniformly thin, uniformly lit large area lighting panel.

It is another object of the invention to provide a large area edge lit lighting panel employing a thin, flat light guide having a planar major surface and an opposite parallel grooved major surface and a reflector adjacent to said grooved surface.

It is a further object of the invention to provide a large area edge lit lighting panel employing a thin, flat light guide having a planar major surface and a parallel shaped major surface having facets which reflect and transmit light along the light guide to the end where it is returned and facets which reflect the returning light to the planar major surface where it is emitted from the planar major surface.

The foregoing and other object of the invention are achieved by a uniformly thin, rectangular light guide having planar side and end surfaces and parallel major surfaces with one of said parallel major surfaces being shaped to provide light-reflecting facets which extend between the side surfaces. A reflecting surface is placed adjacent to the shaped major surface. At least one of said light guide end surfaces is adapted to receive light and transmit the light into the light guide. The facets facing the light receiving end form an angle with said major surface between 1° and 15° to essentially reflect and transmit light along the light guide to the other end surface where it is reflected back through the light guide. The other facets form an angle with the major surface between 35° and 55°, whereby a majority of the light reflected from the other end is reflected upwardly through the upper surface. Light which passes through facets is reflected by the reflecting surface upwardly through the upper major surface.

BRIEF DESCRIPTION OF THE DRAWINGS

The foregoing and other objects of the invention will be clearly understood from the following description when read in conjunction with the drawings of which:

FIG. 3 is a view taken along the line 3—3 of FIG. 2;

FIG. 4 is an enlarged view of a light guide and display assembly showing a light source at one end of the light guide;

FIG. 5 is a view taken along the line 5—5 of FIG. 4;

FIG. 6 is an enlarged view of the light guide and display assembly showing a light source at each end of the display;

DESCRIPTION OF A PREFERRED EMBODIMENT

Figure 1:
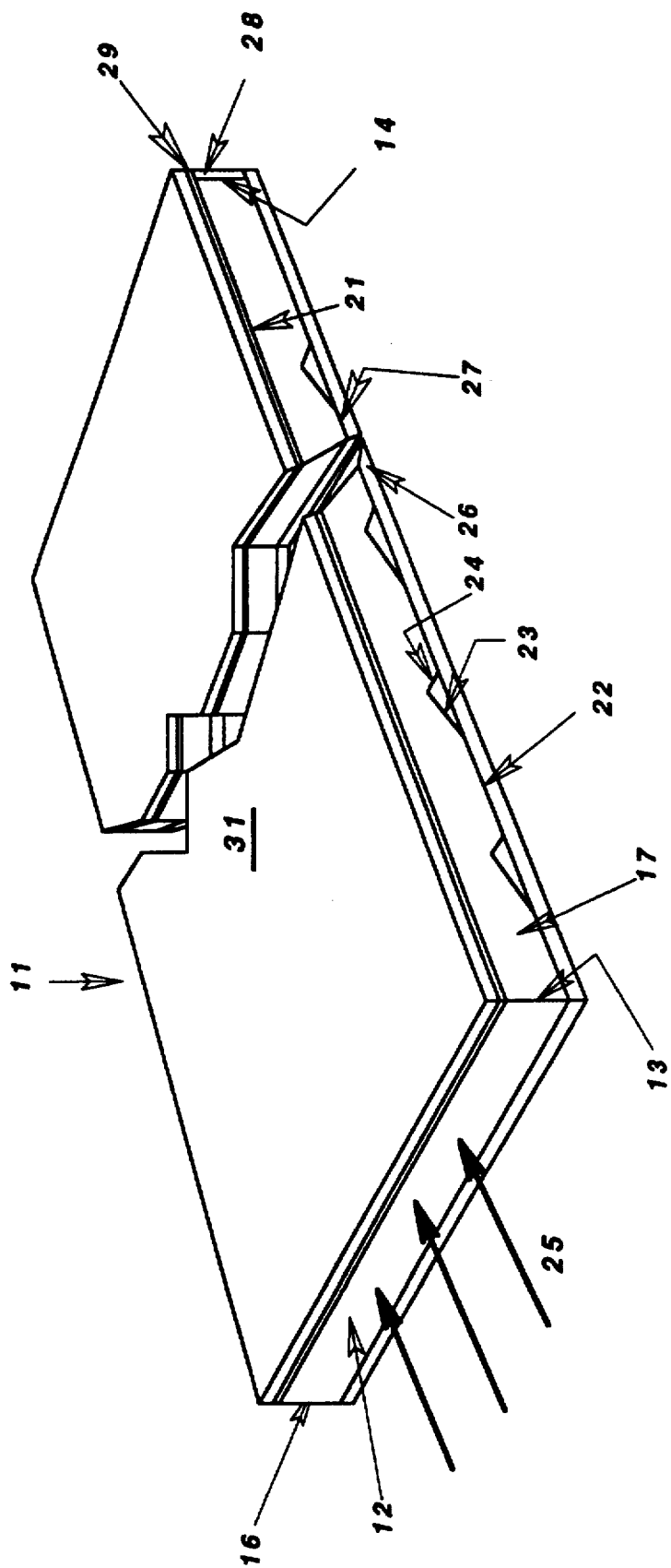
FIG. 1 is a perspective view of a light guide and display assembly in accordance with one embodiment of the invention.

The figures show display assembly 11 which includes a uniformly thin light guide 12 with parallel first and second end surfaces 13 and 14, joined by parallel side surfaces 16 and 17, a planar major upper surface 21, and a shaped major lower surface 22 parallel to the upper layer surface. The shaped lower surface includes optically flat facets 23 and 24. A thin, flat member 26 is placed adjacent to the shaped lower surface and includes a highly reflective light scattering face 27. The light guide typically has a thickness of 1 mm or less. A suitable light source not shown in FIG. 1, projects light illustrated by rays 25 into the light guide through the end surface 13. The facets 23 and 24 of the shaped lower surface 22 extend across the light guide between side surfaces 16 and 17. The facets are generally parallel to the front surface 13. The optically flat facets 23 are inclined upwardly at an angle between 1° and 15°, with respect to the plane of the lower surface 22 and reflecting face 27. Preferably, the facets 23 are inclined between 1° and 10° with respect to the lower surface 22. The depth of the grooves formed by the facets 23, 24 is between 5 and 10 microns. The spacing between the grooves defines lands; the width of the lands is between 1 and 200 microns.

Figure 2:
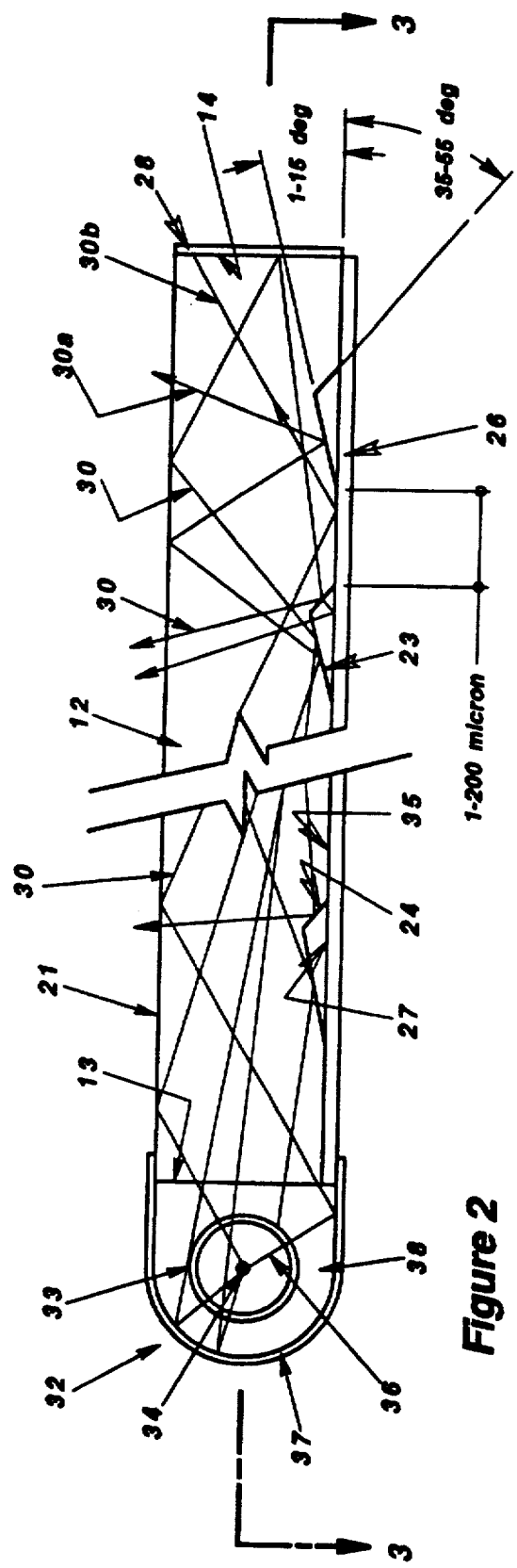
FIG. 2 is an enlarged cross-sectional view of the light guide of FIG. 1.

Referring to FIG. 2, inclined facets 23 specularly reflect light entering the guide from the face 13 along the guide towards the end 14. A reflector 28 is placed adjacent the end 14 to reflect the light back into the light guide. The second facets 24 are inclined downwardly at a steep angle of between 35° and 55° with respect to the plane of the lower surface, preferably between 40° and 50°. The light reflected back into the light guide strikes the facets 24 and is either specularly reflected upwardly through the upper major surface 21 or it strikes the surface at less than the critical angle and is transmitted through the surface to strike the reflecting surface 27 where it is reflected back into the guide and through the upper surface. The light rays 30 illustrate the internal reflection and illumination of the upper surface. The advantage of the inclination of the facets is that they allow the light to travel along the guide and scatter within the guide and thereby provide a more uniform projection of light through the upper surface. In addition, light may be reflected off the surfaces 23 and through the upper surface 2 1. This is illustrated in by ray 30a. The specular reflection of the light provides a highly efficient lighting panel. In the embodiment of FIGS. 1 and 4, the emitted light strikes a diffuser 29 which scatters the light and illuminates an LCD 31. It is, of course, to be understood that the large area lighting panel may be employed to provide large area light for any lighting purpose.

FIGS. 2 and 3 are enlarged views of the large area lighting panel of FIG. 1. A light source 32 projects light into the light guide from the end 13. The light source illustrated includes an elongated incandescent lamp 33 which has a linear, elongated filament 34 which, when heated, emits light in all directions along its length as shown by the arrows 36. A reflector 37 reflects the light back toward the end surface 13. The entering light is reflected along the light guide from the upper surface 21 as well as from the side surfaces 16 and 17, and from the facets 23. Light reflected from reflector 28 which is not emitted from the major upper surface 21 may escape through the end 13 where it is reflected back into the guide by the reflector 37. The flat portions 35 between the faceted grooves transmits light along the panel as shown by ray 30b. This acts together with the facets 23 to direct light along the panel. Additionally, by varying the width of the flat surfaces, longitudinal uniformity of illumination can be further enhanced. Preferably, the side surfaces 16 and 17 are provided with a reflector (not shown) which prevents any light from escaping through these surfaces. Thus, the only way light can leave the light guide is through the upper major surface 21. The relatively uniform light flux provided by the internally reflecting facets 23 and the multiple internal reflections provides a uniform large area lighting panel. In the presence of the multiple reflections caused by the specially designed inclination angle of facets 23 in this invention, the emitted light is uniform over the surface of the panel. In the absence of such multiple reflections, the emitted light is much more intense along the panel opposite the light source when the source does not extend entirely across the width of the panel.

The incandescent lamp 33 may be supported by filling the space between the reflector 37 and end 13 with a transparent resilient material 38 which provides shock and vibration protection. The material can be tinted to provide colored illumination. Preferably, the material has an index of refraction which provides for efficient transfer of light into the light guide. Although an incandescent lamp has been described, other light sources, such as fluorescent lamps, light-emitting diodes, etc. may be used. Preferably, the size of the light source/s should match the thickness of the light guide for high efficiency light coupling.

The light guide 12 is typically an injection molded light transmissive plastic member which, depending on the light source, can emit white light or can be tinted to any desired color for respective colored light emission. By having a uniformly thin light guide, warping of the light guide after injection molding is minimized. The manufacturing process is therefore simplified, and there are no secondary operations such as edge finishing or pattern application as needed in existing technologies.

FIGS. 4 and 5 are sectional views of a lighting panel which includes a plurality of lighting sources such as incandescent lamps 33a and 33b, in which the reference numbers are applied to like parts. This invention provides for a lighting panel which does not include longitudinal striations corresponding to the sources 33a and 33b.

The lighting panel in FIG. 6 may be desirable in certain instances where a more intense light source is desired. The panel includes a second light source assembly 41 similar to assembly 32 which projects light into the guide through the end surface 14. The shape of the lower surface may be modified to provide first and second sets 23a, 23b of inclined surfaces facing each light source assembly 32 and 41. In the embodiment of FIG. 6, the diffuser 29 has been eliminated. We found that a diffuser is optional in the large area lighting panels of this invention because of the substantially uniform emission provided by the uniform light flux in the guide due to the multiple internal reflections. The index matching material 38 associated with the two light sources may be tinted differently, whereby the different colored lighting panels can be provided, two with individual light sources energized and the third with both light sources energized.

Figure 7:
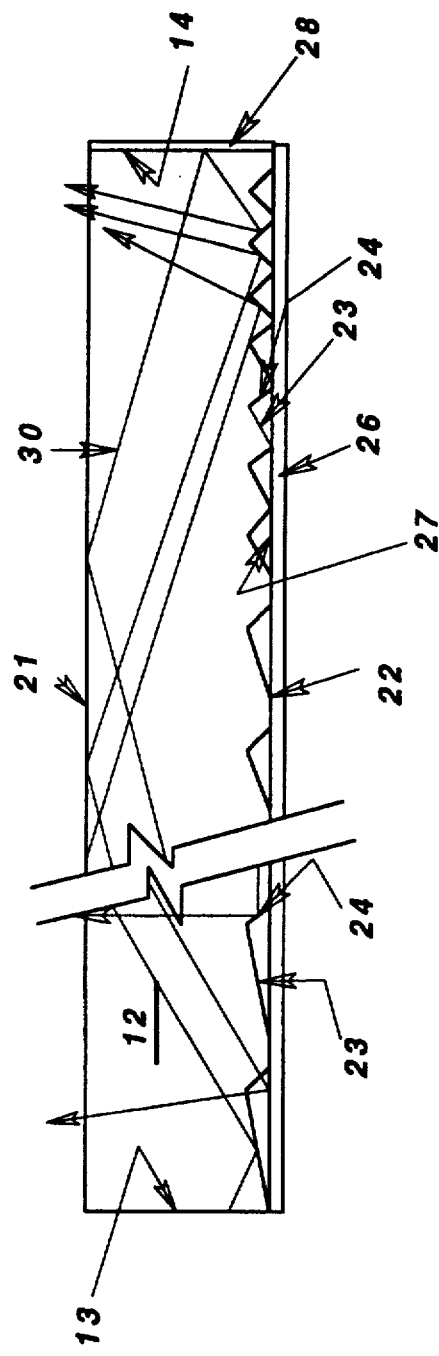
FIG. 7 is an enlarged cross-sectional view of a light guide in accordance with another embodiment of the invention.

If the emitted light reduces in intensity along the panel away from the light source, the angle that the reflecting surfaces 23 make with the plane of the bottom surface can be increased as one progresses along the guide, as schematically shown in FIG. 7. In the alternative, the spacing between facets can be decreased away from the light source, also illustrated in FIG. 7. Variation in both inclination and spacing can be varied along the guide to provide improved uniformity of light along the panel. In FIG. 7, the angle of the facets and/or spacing are varied away from the light source. It is apparent that the same principle can be applied to the faceted grooves of FIG. 6.

Lighting panels have been described where the panel provides illumination to an LCD which is associated with the planar upper major surface. The lighting illustrated is back-lighting; that is, the light passes through the LCD where it is viewed at the upper surface.

Figure 8:
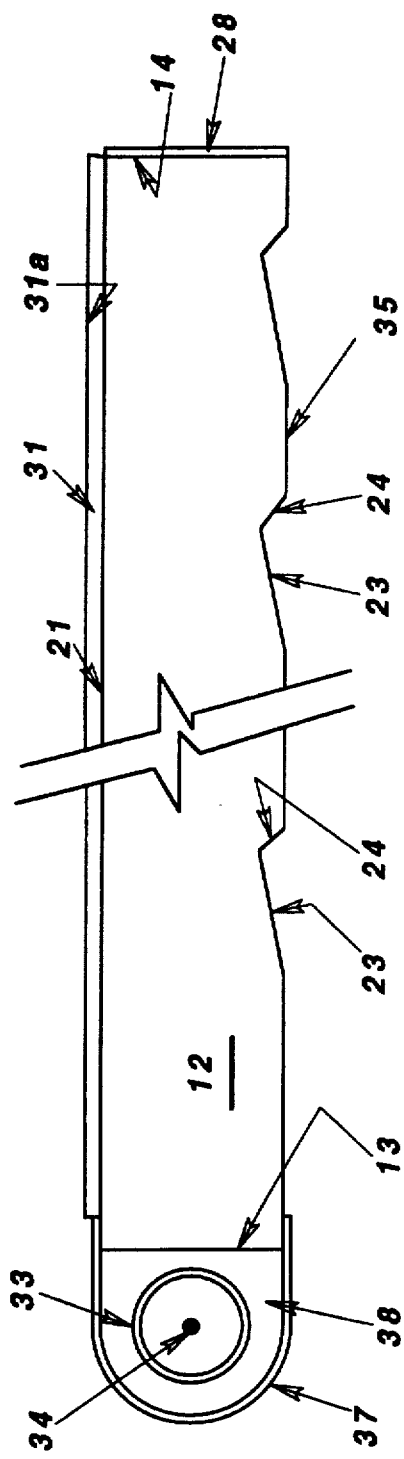
FIG. 8 is an enlarged cross-sectional view of a lighting panel and LCD in accordance with another embodiment of the invention.

FIG. 8 shows another embodiment of the invention where the LCD is front-lit. Like reference numbers have been applied to like parts. The front surface of the LCD 31 is placed against the planar major surface. Light from the lighting panel travels through the LCD 31 and is reflected back toward the panel from the reflecting back surface 31a of the LCD. The LCD is read or observed through the light guide 12. Although there is some loss of light through the faceted grooved surface, we have found that the LCD display is efficiently lit.

Figure 9:
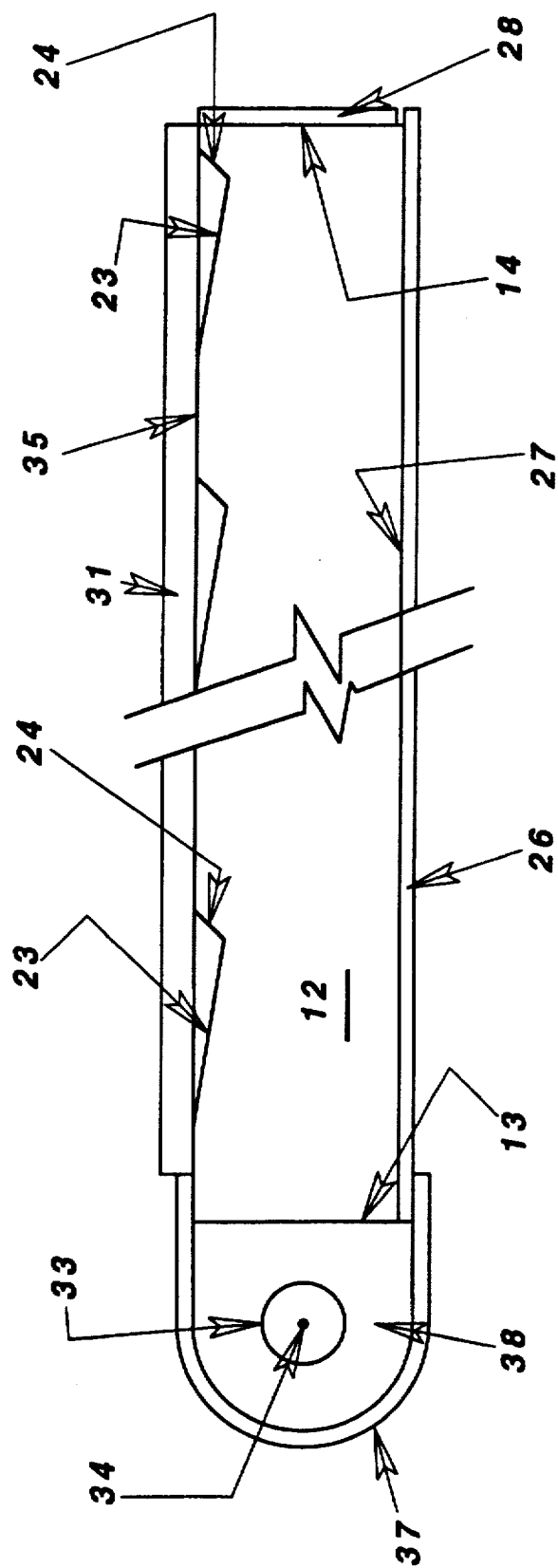
FIG. 9 is an enlarged cross-sectional view of a lighting panel and LCD in accordance with still another embodiment of the invention.

FIG. 9 shows an embodiment of the invention where the LCD 31 is back-lit by placing it on the faceted major surface. The reflecting surface 27 is adjacent to the planar major surface 21 of the light guide. Like reference numbers have been used to identify 1.5 parts like those previously described. The light reflected by the facets 24 is reflected from the reflecting surface 27 back through the guide to back-light the LCD. Light transmitted by the facets 24 impinges directly on the LCD.

This invention offers an improved lighting panel which provides uniform illumination across the width and along the length of the panel regardless of the type of light source employed. Uniformly thin lighting panels in accordance with this invention can be easily and inexpensively manufactured.

What is claimed:

1. A lighting panel comprising a uniformly thin transparent optical guide having parallel end, surfaces, parallel side surfaces, first and second major surfaces and a light source for projecting light into said light guide through one of said end surfaces characterized in that:

one of said major surfaces includes faceted grooves which extend from one said side surface to the other said side surface, said faceted grooves including first optically flat facets facing said light source, making an angle of between 1° and 15° with the plane of said major surface, and having second, optically flat facets facing away from the light source, making an angle of between 35° and 55° with respect to the plane of said major surface, said grooves being spaced to provide flat spacings of between 1 and 200 microns between said faceted grooves, whereby said first optically flat facets and spacings primarily reflect light from the source toward the other end surface, and whereby said second facets reflect light primarily toward the other major surface.

2. A lighting panel as in claim 1 wherein the depth of the grooves is between 5 and 10 microns.

3. A lighting panel as in claim 1 wherein a reflecting surface is placed adjacent to said faceted grooved surface to reflect light that escapes from the grooved surface back into the guide and towards said other major surface.

4. A lighting panel as in claims 1, 2 or 3 wherein the angle between the flat facets facing the light source and the plane of said one major surface is between 1° and 10°, and the angle between the facets facing away from the light source and the plane of said major surface is between 40° and 50°.

5. A lighting panel as in claim 1 wherein said light source includes at least one light source which is narrower than the width of the panel between said first and second side surfaces.

6. A lighting panel as in claim 1 wherein the angle between said facets facing the light source and the plane of said major surface increases along the light guide away from the light source.

7. A lighting panel as in claim 1 wherein the width of the spacings decreases in the direction away from the light source.

8. A lighting panel as in claim 1 wherein the angle between the facets facing the light and the plane of said major surface increases in a direction away from the light source and wherein the width of the lands decreases in a direction away from the light source.

9. A lighting panel as in claim 1 wherein the light source includes an elongated incandescent lamp having a filament parallel to said end surface, a reflector surrounding said lamp to reflect light into the light guide and a transparent resilient material supporting said lamp having a refractive index which substantially matches the refractive index of the light guide.

10. A lighting panel as in claim 9 wherein the transparent resilient material is tinted.

11. A liquid crystal display assembly comprising:

a lighting panel including a uniformly thin, transparent optical guide having parallel end, surfaces, parallel side surfaces, first and second major surfaces and a light source for projecting light into said light guide through one of said end surfaces in which one of said major surfaces includes faceted grooves which extend from one said side surface to the other said side surface, said faceted grooves including first optically flat facets facing said light source, making an angle of between 1° and 15° with the plane of said major surface, and having second, optically flat facets facing away from the light source making an angle of between 35° and 55° with respect to the plane of said major surface, said grooves being spaced to provide flat spacings of between 1 and 200 microns between said faceted grooves, whereby said first optically flat facets and spacings primarily reflect light from the source toward the other end surface, and whereby said second facets reflect light primarily toward the other major surface, and a liquid crystal display mounted on said other major surface to be back-lit by the lighting panel.

12. A liquid crystal display assembly as in claim 11 including a reflecting surface adjacent said faceted grooved surface to reflect light which escapes from the grooved surface back into the guide and towards the liquid crystal display.

13. A liquid crystal display assembly as in claim 12 including a light diffuser interposed between said liquid crystal display and said other major surface.

14. A liquid crystal display assembly comprising:

a lighting panel including a uniformly thin transparent optical guide having parallel end surfaces parallel side surfaces, first and second major surfaces and a light source for projecting light into said light guide through one of said end surfaces wherein:

one of said major surfaces includes faceted grooves which extend from one said side surface to the other said side surface, said faceted grooves including first optically flat facets facing said light source, making an angle of between 1° and 15° with the plane of said major surface, and having second, optically flat facets facing away from the light source, making an angle of between 35° and 55° with respect to the plane of said major surface, said grooves being spaced to provide flat spacings of between 1 and 200 microns between said faceted grooves, whereby said first optically flat facets and spacings primarily reflect light from the source toward the other end surface, and whereby said second facets reflect light primarily toward the other major surface, and a liquid crystal display mounted on said other major surface to be front-lit by the lighting panel.

15. A liquid crystal display assembly as in claims 11, 12, 13 or 14 wherein the angle between the flat facets facing the light source and the plane of said one major surface is between 1° and 10°, and the angle between the facets facing away from the light source and the plane of said major surface is between 40° and 50°.

16. A liquid crystal display assembly as in claims 11 or 14 wherein said light source includes at least one light source which is narrower than the width of the panel between said first and second side surfaces.

17. A liquid crystal display assembly as in claims 11 or 14 wherein the angle between said facets facing the light source and the plane of said major surface increases along the light guide away from the light source.

18. A liquid crystal display assembly as in claims 11 or 14 wherein the width of the spacings decreases in the direction away from the light source.

19. A liquid crystal display assembly as in claims 11 or 14 wherein the angle between the facets facing the light and the plane of said one major surface increases in a direction away from the light source and wherein the width of the spacings decreases in a direction away from the light source.

20. A liquid crystal display assembly as in claims 11 or 14 wherein the light source includes an elongated incandescent lamp having a filament parallel to said end surface, a reflector surrounding said lamp to reflect light into the light guide, and a transparent resilient material supporting said lamp having a refractive index which substantially matches the refractive index of the light guide.

21. A liquid crystal display assembly as in claim 20 wherein the transparent resilient material is tinted.

22. A lighting panel comprising a uniformly thin transparent optical guide having parallel end surfaces, parallel side surfaces, first and second major surfaces and a light source at each end surface for projecting light into said light guide, characterized in that:

one of said major surfaces includes first and second sets of faceted grooves which extend from one said side surface to the other said side surface, said faceted grooves in each set including first optically flat facets facing the respective light source, making an angle of between 1° and 15° with the plane of said major surface, and having second, optically flat facets facing away from the respective light source, making an angle of between 35° and 55° with respect to the plane of said major surface, said grooves being spaced to provide flat spacings of between 1 and 200 microns between said faceted grooves, whereby said first optically flat facets and spacings primarily reflect light from the source toward the other end surface, and whereby said second facets reflect light primarily toward the other major surface.

23. A lighting panel as in claim 22 wherein the depth of the grooves is between 5 and 10 microns.

24. A lighting panel as in claim 22 wherein a reflecting surface is placed adjacent to said faceted grooved surface to reflect light that escapes from the grooved surface back into the guide and towards said other major surface.

25. A lighting panel as in claims 22, 23 or 24 wherein the angle between the flat facets facing the light source and the plane of said one major surface is between 1° and 10°, and the angle between the facets facing away from the light source and the plane of said major surface is between 40° and 50°.

26. A lighting panel as in claim 22 wherein the angle between said facets facing each light source and the plane of said major surface increases along the light guide away from each light source.

27. A lighting panel as in claim 22 wherein the width of the spacings decreases in the direction away from each light source.

28. A lighting panel as in claim 22 wherein the angle between the facets facing each light source and the plane of said major surface increases in a direction away from each light source and wherein the width of the spacings decreases in a direction away from each light source.

29. A liquid crystal display assembly comprising:

a lighting panel including a uniformly thin, transparent optical guide having parallel end surfaces, parallel surfaces, first and second major surfaces and a light source for projecting light into said light guide through one of said end surfaces in which one of said major surfaces includes faceted grooves which extend from one said side surface to the other said side surface, said faceted grooves including first optically flat facets facing said light source, making an angle of between 1° and 15° with the plane of said major surface, and having second, optically flat facets facing away from the light source, making an angle of between 35° and 55° with respect to the plane of said major surface, said grooves being spaced to provide flat spacings of between 1 and 200 microns between said faceted grooves, whereby said first optically flat facets and spacings primarily reflect light from the source toward the other end surface, and whereby said second facets reflect light primarily toward the other major surface, and a liquid crystal display mounted on said major surface to be back-lit by the lighting panel.

30. A liquid crystal display assembly as in claim 29 including a reflecting surface adjacent to the other major surface to reflect light which escapes from the surface back into the guide and towards the liquid crystal display.

31. A liquid crystal display assembly as in claims 29 or 30 wherein the angle between the flat facets facing the light source and the plane of said one major surface is between 1° and 10°, and the angle between the facets facing away from the light source and the plane of said major surface is between 40° and 50°.

* * * * *